Jan. 22, 1952     F. NIESEMANN     2,583,006
FLUID PRESSURE REGULATOR

Filed May 25, 1943     2 SHEETS—SHEET 2

Inventor
FRITZ NIESEMANN
By
Lewis D. Konigsford
Attorney

Patented Jan. 22, 1952

2,583,006

UNITED STATES PATENT OFFICE 2,583,006

FLUID PRESSURE REGULATOR

Fritz Niesemann, Pittsburgh, Pa., assignor to Rockwell Manufacturing Company, a corporation of Pennsylvania Application May 25, 1943, Serial No. 488,370

1 Claim. (Cl. 137—153)

This invention relates to fluid pressure regulators and relates in particular to such regulators in which the outlet pressure characteristics are modified to produce a desired outlet pressure and rate of flow.

According to the present invention I provide in a pilot controlled valve comprising a main regulator and a second or pilot regulator controlled from any desired source for supplying a loading pressure thereto which bleeds slowly to any desired point, means to separate the pilot regulator outlet pressure from the pilot regulator control pressure. The bleed opening may be located as desired. Where bleeding into the control pressure source is desired, a small bleed between the pilot regulator outlet pressure and the pilot regulator control pressure may be provided, this bleed being so small as to be substantially without influence on the control pressure, and I may utilize the guide for the pilot valve member to provide a part or the whole bleed thereby greatly simplifying the structure. The area of the bleed orifice thus is uniform, and if desired, the bleed orifice may be made variable by suitably shaping the guide. This eliminates the use of a stuffing box, sealing diaphragm, counterbalancing diaphragm or the like. Because of the small size of the pilot valve, the relatively small flow through the valve, and its relative small range of movement, I generally find it unnecessary to employ a balanced type of pilot valve member, although I do not intend to preclude such a pilot valve member from the present invention.

The main valve may be employed as a shut off valve by providing an on and off shut off valve in the supply line or outlet line of the pilot regulator and arranging the structure so that when the pilot regulator supply line is shut off or the outlet is shut off, the loading pressure on the main regulator falls below a predetermined minimum and a spring or other suitable means closes the main valve. The so called shut off valve in the pilot regulator supply or outlet line may be controlled by any suitable on and off means or any suitable modulating means such as a gas valve thermostat or by an electrically operated thermostat valve, a timer or the like, and when operated by some modulating means, the main regulator valve becomes a modulating valve operable as such throughout the whole range between the minimum and maximum flow of the regulator, or in any desired portion of such range, depending among other things, upon the characteristics of the modulating action on the pilot inlet or outlet. If desired, a minimum flow bypass around the shut off valve in the pilot flow may be provided, governed by an on and off valve, as for example a heat responsive pilot flame safeguard.

In the above described system or in the various modifications thereof, where the pilot regulator is controlled by the outlet pressure of the main regulator (it being understood that a burner, friction loss, or some other type of restriction is provided in the main regulator outlet beyond the point of connection of the pilot regulator thereto) the main regulator tends to maintain a constant or predetermined maximum pressure at the control point to which the pilot regulator is connected, and at ordinary atmospheric pressure this constant or predetermined maximum pressure will be a constant amount above atmospheric pressure, which amount will depend on the setting of the regulator. Where it is desired to vary the maximum outlet pressure of the main regulator, I vary the load on the pilot regulator so that a different control pressure becomes necessary to operate the pilot regulator valve and thus the main regulator tends to maintain a constant control pressure as required by the loading on the pilot regulator. This variation may be made dependent on a thermostat, pressure responsive device, or any suitable force or factor which, it is desired, shall govern the operation of the main regulator.

Where the pilot regulator is to be controlled by a variation in atmospheric pressure, I prefer to employ as the atmospheric pressure responsive element a piston, push rod, or the like having a vacuum on one side thereof and sealed by a flexible bellows or other type of flexible diaphragm, with a spring biasing said piston opposite the force of atmospheric pressure. Thus, a change in atmospheric pressure changes the force exerted by the spring, and the piston or push rod acts on the pilot loading spring to change the load on the pilot diaphragm, and in consequence change the outlet ressure of the main regulator.

The invention will be described in greater detail in the following specification taken in connection with the accompanying drawing, wherein are disclosed preferred embodiments of the invention by way of example, and wherein.

Figure 1:
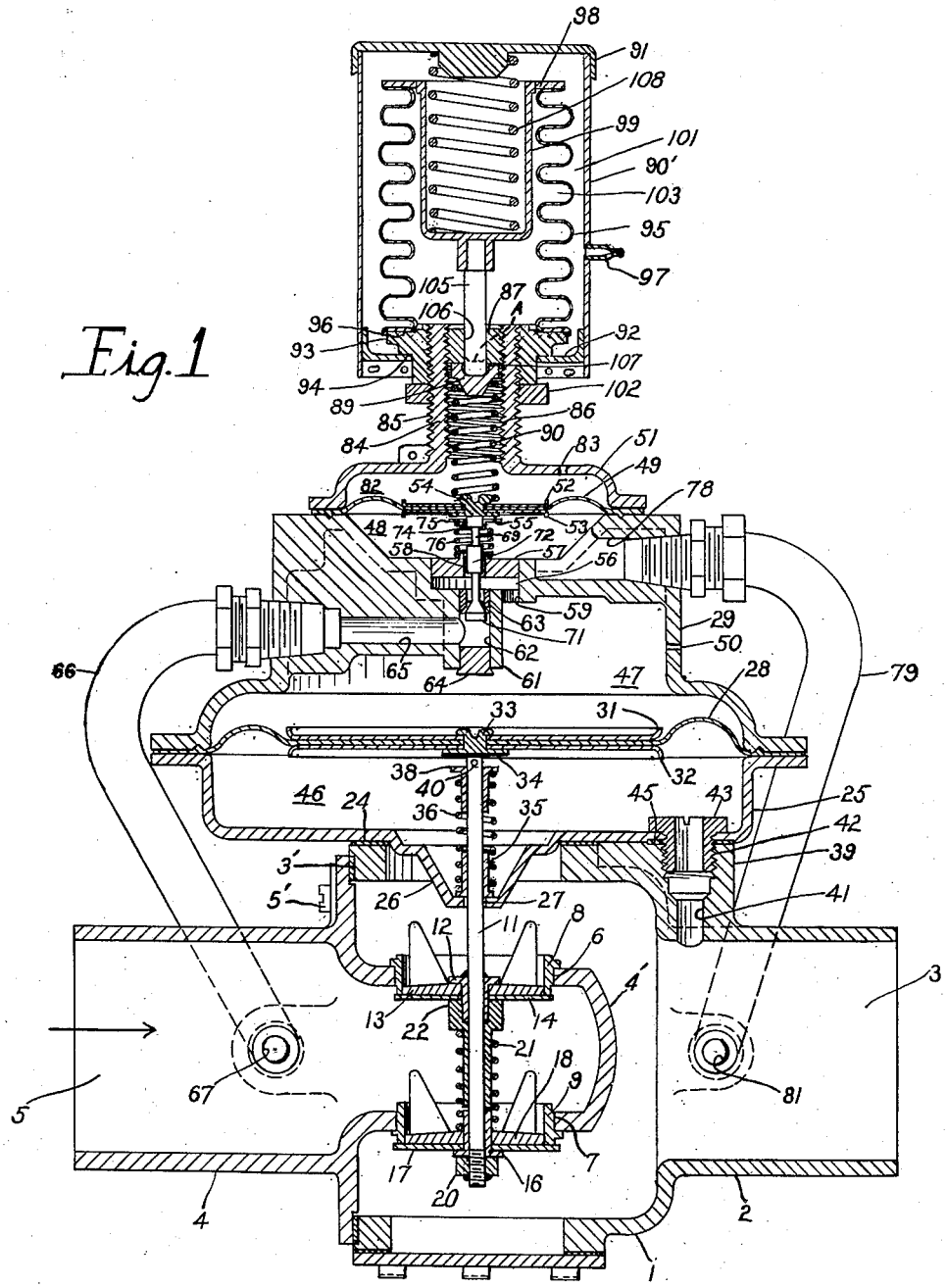
Figure 1 is a vertical sectional view of a preferred embodiment.

Referring to the drawing, the valve housing 1 is made up of two parts comprising an outlet bowl 2 having an outlet opening 3 therein and a flat surface 3' which receives the inlet bowl 4 having an inlet opening 5. The two parts are secured together by screws 5'. Inlet bowl 4 has a dividing wall 4' with openings 6 and 7 in which are located seat bushings 8 and 9 with a pressed fit. Valve stem 11 extends through the bowl and has an upper flanged sleeve 12 acting as a stop and soldered or otherwise secured in proper location. A valve wing guide plate 13 and a flexible valve disk 14 engages the flange of sleeve 12, the valve disk seating upon the inner edge of orifice bushing 8. At the lower end of the stem is located a similar flanged sleeve or stop member 16 and a flexible valve disk 17 and valve wing guide plate 18 are positioned on the sleeve and are retained by the flange thereof. If desired, the valve wing guide may be integral with the valve disk. A spacer 22 receives the end of sleeve 12 and is held against the upper valve disk 14 by a spring 21 which at its lower end abuts the valve guide plate 18, and thus maintains the valves in separated position. The spacer 22 is separated a small amount from the upper end of sleeve 16 so as to allow for adjustment of nut 20, this space being small enough to prevent spacer 22 slipping off of sleeve 12. Spacer 22 prevents a sudden jolt from dislocating the valves and valve guides. A nut 20 threaded on the end of stem 11 positions the sleeve 16 relatively to sleeve 12 so that the valve disks 14 and 17 properly seat on orifice seats 8 and 9.

The valves are assembled to the stem by first placing sleeve 12 thereon and soldering it in position, and the valve guide plate 13 is placed on sleeve 12. Then valve disk 14 is inserted into the inlet bowl through inlet opening 5 and the stem 11 is passed through the valve opening in bushing 8 and through the opening in the valve 14. The spacer 22 then is slipped over the stem and the spring 21 passed over the spacer. The sleeve 16 is passed through the holes in lower valve 17 and lower wing plate 18 respectively and the assembly is then passed over the end of stem 11 which extends through the valve orifice in bushing 9. The nut 20 then is threaded on the stem 11 and adjusted so that the valves 14 and 17 substantially simultaneously engage their respective seats, and the nut 20 is then soldered in position.

A diaphragm case 25 is suitably secured to one side of the valve case 1 upon a gasket 24 by screws (not shown) or other suitable means and has a central projecting portion 26 with an aperture 27 through which extends the valve stem 11. The diaphragm 28 is suitably secured between the casing 25 and a cover 29, the diaphragm plates 31 and 32 being secured to the central portion of the diaphragm by a rivet 33 or the like, providing a substantial flat surface 34.

Hole 27 is made amply large so that any lateral movement of stem 11 will not cause the stem to engage or bind against the edges thereof, and flanged sleeve 35 fits over stem 11 so as to partly close off or reduce the clearance area between the stem and hole 27, and one end of the spring 36 abuts this sleeve. Ample clearance is allowed between the flange of sleeve 35 and projecting portion 26 to allow any required lateral movement of sleeve 35 and stem 11, the stem being guided for substantially rectilinear movement by the wing guides plates 13 and 18. The upper end of spring 36 abuts sleeve 38, limited against endwise movement by a stop pin 40 or the like, and thus the end of stem 11 is held against surface 34 of the diaphragm. Preferably sleeve 38 is of such length and is pinned to stem 11 in such position so that sleeve 38 engages sleeve 35 to limit downward movement of stem 11, should the valves fall wide open for any reason. The outlet bowl 2 has a boss 39 through which extends an opening 41 threaded at 42, and flanged bushing 43 is threaded into the hole 41 and serves to compress a gasket 45 between the diaphragm casing 25 and outlet bowl 2 to prevent leakage at this point. There is thus provided a conduit or passage 41 between the diaphragm control chamber 46 and the outlet opening 3. The chamber above the diaphragm 28 within the cover 29 is designated at 47 and may be called the loading chamber.

Cover 29 has a depression 48 which is covered by a diaphragm 49 clamped between the cover 29 and a cover 51. Diaphragm plates 52 and 53 are secured at the center of the diaphragm 49 by a rivet 54 which provides a flat surface 55 on the underside. A bore 62 extends through a boss 61 and has a valve orifice bushing 63 pressed therein to provide a valve orifice therethrough and a valve seat on the underside. A counterbore 56 receives a guide plate 57 with a pressed fit, and which has a central guide aperture 58 therein and the space or chamber in bore 56 below plate 57 communicates with loading chamber 57 by a bore 59. After the valve member 69 is inserted through bore 62 the bore is closed by a plug 64. A passage 65 extending through boss 61 into bore 62 connects by an external hose or pipe 66 through a hole 67 with the inlet opening 5. The valve member 69 provides a tapered valve head 71 adapted to seat against valve bushing 63, and an enlarged stem portion 72 which fits the guide bore 58 with a relatively loose fit so as to allow free movement of the valve stem. The valve member has a head 74 which abuts the flat surface 55 provided on diaphragm 49. A flanged cup or ferrule 75 on head 74 is engaged by spring 76 at one end, the other end of the spring abutting guide plate 57 so as to hold valve stem 69 against diaphragm 49.

Chamber 48, which may be designated as the pilot valve control chamber, is connected by a passageway 78 and a tube or hose 79 connected by opening 81 with the outlet opening 3. If desired this tube may open into bore 41, thereby securing greater uniformity in pressure between chambers 48 and 46. Bore 59 and the space below guide member 57 may be considered the outlet of the pilot regulator. The flow from this outlet through the clearance between bore 58 and thickened portion 72 of the stem provides a bleed from chamber 47 into chamber 48 and through tube 79 into the outlet 3. This bleed should be small enough so as not to appreciably change the pressure in chamber 48 conducted thereto by tube 79, and thus the loading pressure in chamber 47 has no appreciable effect on diaphragm 49. If a larger bleed is desired than is provided by this clearance space, a hole 50 may be provided to the atmosphere, or holes may be provided in plate 57 or in any part of the wall of chamber 47 connecting into passageway 78. Where the bleed is not to atmospheric pressure I prefer to employ the spring 36 or some equivalent means to cause valves 14 and 17 to close when the pressure in chamber 46 falls. The chamber 82 above diaphragm 49 may be designated in this particular modification as the atmospheric or barometric pressure chamber and is vented to the atmosphere by a vent 83. Cover 51 has an extension 84 screw threaded externally at 85 and bored and threaded at 86. An adjustable bushing 87 is threaded into bore 86 and holds in place a spring ferrule 89 which is abutted by the upper end of spring 90, the lower end of this spring engaging diaphragm 49 to load the same.

The operation of the apparatus so far described will now be explained. Ordinarily, the outlet 3 of the regulator will be connected to an apparatus such as a burner which provides a restriction on flow from the outlet to the atmosphere, and it is desired that the pressure difference across this restriction be maintained constant. The inlet pressure at 5 may be variable, and if desired, the restriction may be a variable one. Assuming a decrease in outlet pressure at 3 occurs, this pressure is communicated by tube 79 and passage 78 to pilot valve control chamber 48, and because of the relatively large size of these conduits the pressure in chamber 48 may be regarded as substantially the same as the pressure in outlet 3. The spring 90 is initially compressed by bushing 87 to place an initial load on diaphragm 49 and when the pressure in chamber 48 drops lower than required to support diaphragm 49 against this load, the diaphragm descends and opens valve 71 to allow a greater flow therethrough. This flow comes from the high pressure side through conduits 66, 65 and bore 62, and passing through valve bushing 63 enters bore 56 and flows through bore 59 into chamber 47 faster than it can escape through the vents thereof and thus builds up a loading pressure in chamber 47 which moves diaphragm 28 and valve stem 11 downward to open valves 14 and 17 and allow an increased flow into outlet 3. This increased flow in outlet 3 continues until the pressure in outlet 3 increases, and being transmitted to chamber 48 raises diaphragm 49 to allow spring 76 to close or throttle valve 71. The pressure in chamber 47 bleeds through the space around stem portion 72 into chamber 48, and the control pressure in chamber 48 tends to maintain valve 71 in such position as to secure the desired relationship between the flow through valve orifice 63 and the bleed to maintain the desired pressure in chamber 47 for maintaining the desired condition in outlet 3. Thus, the pressure in chamber 47 is not necessarily constant but may be varied to maintain the pressure in outlet 3 constant, and the pressure in chamber 47 will not directly affect the control diaphragm 49. A decrease in pressure in chamber 47 causes diaphragm 28 and stem 11 to be raised to close or throttle valves 14 and 17 and an increase in pressure in chamber 47 causes the diaphragm and stem 11 to lower and open wider valves 14 and 17. The pressure in outlet 3 will be determined by the force exerted by spring 90 upon diaphragm 49.

In applying the invention to the control of the air supply of a fuel burning heater for an aeroplane, the air inlet orifice for the burner becomes the restriction and the regulator will maintain a constant pressure difference across this restriction independent of the altitude of the aeroplane. However, at higher altitudes the specific gravity of the air changes, and as the burner requires a constant gravimetric flow of air to support combustion of a constant weight of fuel, the weight of air supplied to the burner will diminish, due to the lower specific gravity of the air.

In applying the invention to a burner under such conditions, I provide means for increasing the pressure difference across the restriction so that the gravimetric flow of air will be sufficient to support combustion of the fuel, and I will now describe the means by which this is accomplished.

In applying the invention to the control of the air supply of a fuel burning heater for an aeroplane, I provide a housing 90', which as shown, is made up of a cylindrical portion having a head 91 and an internal flange 92 soldered thereon, and a hub 93 or the like, provides a shoulder 94 to which the flange 92 is soldered or otherwise secured in airtight relation. A sealing bellows 95 is soldered to one surface 96 of the hub and its other end is soldered to the flange 98 of a spring sleeve 99 to form a gas-tight chamber 101 and an interial chamber 103. This chamber 101 is evacuated through tube 97 which is then crimped, fused and soldered or sealed in any other suitable manner. The sub 93 is threaded on the extension 85 of cover 51 and may be held in an established position by a locknut 102 and sealed in this position by a wire and lead seal. A stem 105 is secured to the lower end of the spring sleeve 99 and its lower end passes through a guide hole 106 in guide bushing 87 and into a recess 107 in spring ferrule 94. A spring 108 in spring sleeve 99 abuts the sleeve and the cover 91 at its other end.

In operation the chamber 101 is evacuated and thus comprises an initial compression for spring 108 which depends upon the barometric pressure. The internal chamber 103 communicates with the atmospheric pressure chamber 82 through the hole 106 in bushing 87. By adjusting the casing 90' up or down on extension 85 the sleeve 99 may move upward to bring stem 105 out of engagement with spring ferrule 89 as indicated at A so that spring 108 will have no effect upon spring 84 until a predetermined barometric pressure prevails in chamber 103. When the aeroplane reaches an altitude such that the barometric pressure allows spring 108 to expand and bring stem 105 into contact with the ferrule 89, the spring 90 will be deflected to further load diaphragm 49 and thus require an increased pressure in the chamber 48 to balance diaphragm 49. Thus, a greater pressure will be built up in outlet 3, with a consequent increase in pressure difference across the restriction that increases the volume of air supplied to the fuel burner sufficiently to provide an approximately constant gravimetric flow.

Figure 2:
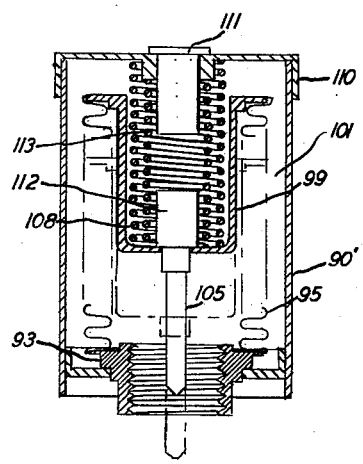
Figure 2 is a vertical sectional view of a detail of a further modification.

In the modification shown in Figure 2, wherein like parts are correspondingly numbered, there is employed what I refer to as a characterized aneroid. The cover 110 of the housing 90' has a stem 111 extending through the central boss, this stem being sealed with respect to the cover. The spring sleeve 99 has a similar boss 112 extending therefrom which may be integral with the sleeve, or separate therefrom and is secured in gas-tight relation, and a second spring 113 is introduced in the sleeve 99 and is guided by stems 111 and 112. This spring 113 is shorter than spring 108, and preferably is stronger and it is initially compressed to a lesser extent than spring 108 by evacuation of the chamber 101. The springs are so proportioned that before the full limit of downward movement of sleeve 99 is reached as shown by the dot and dash lines, the upper coil of spring 113 moves entirely away from cover 110, while spring 108 is still under compression, so that thereafter only spring 108 acts to move the sleeve 99.

Figure 3:
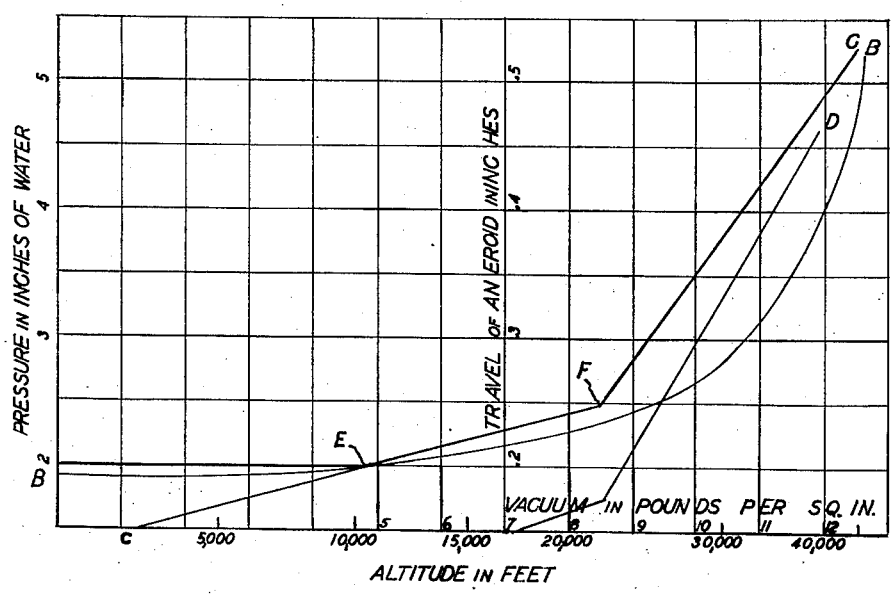
Figure 3 is a curve graphically illustrating the performance of the apparatus.

The action of the springs 108 and 113 will be more clearly understood by reference to the graph shown in Figure 3. In this graph in curves B and C the outlet pressure in inches of water is plotted against the altitude in feet, and the movement of the aneroid element is plotted against vacuum. The curve B represents the outlet pressure requirement to maintain a constant gravimetric flow of gas. In the curve D the movement of stem 105 in inches is plotted against the force of springs 108 and 113 in pounds. The curve C represents the outlet pressure produced by the characterized aneroid assembly. Thus for example, if the case 90' (Fig. 1) is turned to bring stem 105 to the position A, the aneroid assembly will be without influence on the diaphragm 49 until the point E is reached and thus the outlet pressure up to this point will follow curve B. At this point however, the springs 108 and 113 come into play and modify the action of spring 90 to change the outlet pressure causing it to follow curve C until the point F is reached. At this point spring 113 has expanded to its free length and ceases to function and spring 108 alone deflects the spring 90 and thus causes the curve C to move at a different angle and increase the ratio of outlet pressure to altitude. By suitable selection of springs 108 and 113, or by employing more than two springs, the actual outlet pressure curve C may be made to conform approximately to the curve B at any desired point or points.

The invention may be embodied in other specific forms without departure from the spirit or essential characteristics of the present invention. The specific form described herein therefore is to be considered in all respects as illustrative and not restrictive of the invention.

What is claimed and desired to be secured by United States Letters Patent is:

In a fluid controller, a main valve casing having main inlet and outlet connections and a dividing wall therebetween providing a valve orifice, a diaphragm and a cover secured to said casing providing main control and loading chambers on opposite sides of said diaphragm, valve means actuated by said diaphragm for controlling flow through said valve orifice from said inlet to said outlet, a passage connecting said main control chamber with said outlet, a second casing and a second diaphragm providing a pilot valve control chamber and an atmospheric pressure chamber on opposite sides of said second diaphragm, a conduit connecting said pilot valve control chamber with the main valve outlet, an inlet passageway in said second casing connecting said main loading chamber to the main valve inlet, a pilot valve in said inlet passageway operated by said second diaphragm, spring means for biasing said second diaphragm, a pressure responsive device mounted on said second casing comprising a diaphragm having an evacuated chamber on one side and an atmospheric pressure chamber on the other side thereof, means operated by said latter diaphragm engaging said latter spring means to vary the biasing action thereof for controlling pilot valve operation to vary the main valve outlet pressure as a result of changes in atmospheric pressure, and a plurality of springs of different effective lengths on one side of said latter diaphragm opposing the force of atmospheric pressure thereon for modifying the effect of said changes in atmospheric pressure upon the main valve outlet pressure in a predetermined manner.

FRITZ NIESEMANN.

REFERENCES CITED

The following references are of record in the file of this patent:

UNITED STATES PATENTS

| Number | Name | Date |
| --- | --- | --- |
| 1,173,834 | Metzer | Feb. 29, 1916 |
| 1,407,575 | Prouty | Feb. 21, 1922 |
| 1,489,811 | Beggs | Apr. 8, 1924 |
| 1,926,069 | Sutton | Sept. 12, 1933 |
| 1,927,727 | Whitehurst | Sept. 19, 1933 |
| 1,994,660 | Painter | Mar. 19, 1935 |
| 1,995,726 | Soderberg | Mar. 26, 1935 |
| 2,196,279 | Thomas | Apr. 9, 1940 |
| 2,313,149 | Jacobsson | Mar. 9, 1943 |

FOREIGN PATENTS

| Number | Country | Date |
| --- | --- | --- |
| 77,027 | Germany | Sept. 5, 1894 |
| 405,870 | Great Britain | Feb. 15, 1934 |
| 419,920 | Great Britain | Nov. 21, 1934 |
| 455,139 | Great Britain | Oct. 15, 1936 |